J. H. AUFDER HAAR.
AUTOTRUCK.
APPLICATION FILED APR. 29, 1915.
1,171,043.
Patented Feb. 8, 1916.
3 SHEETS—SHEET 3.
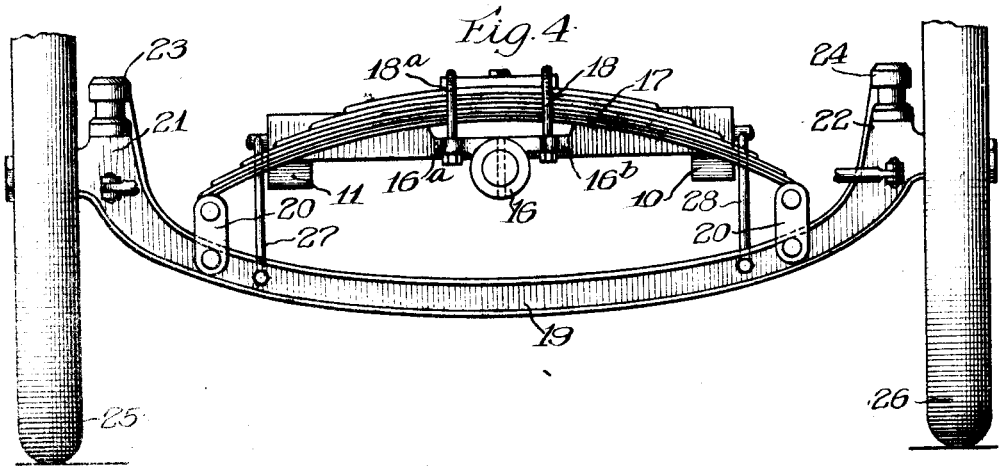
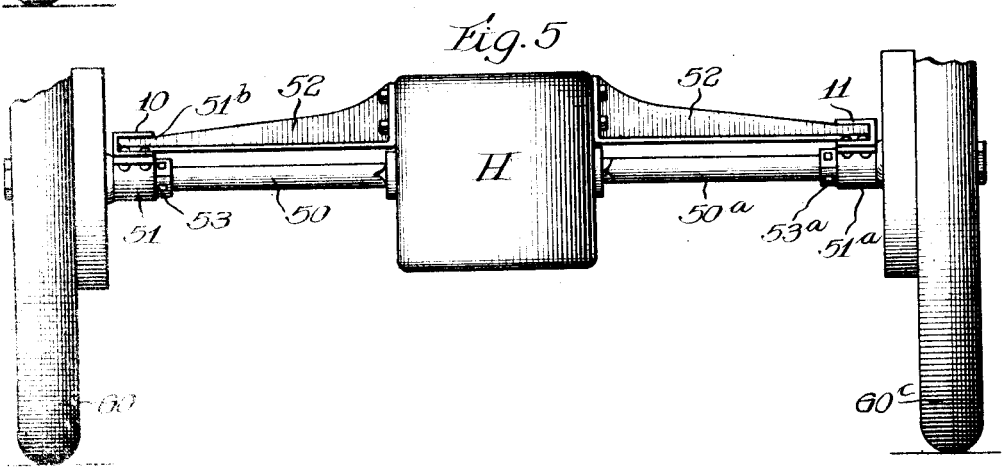
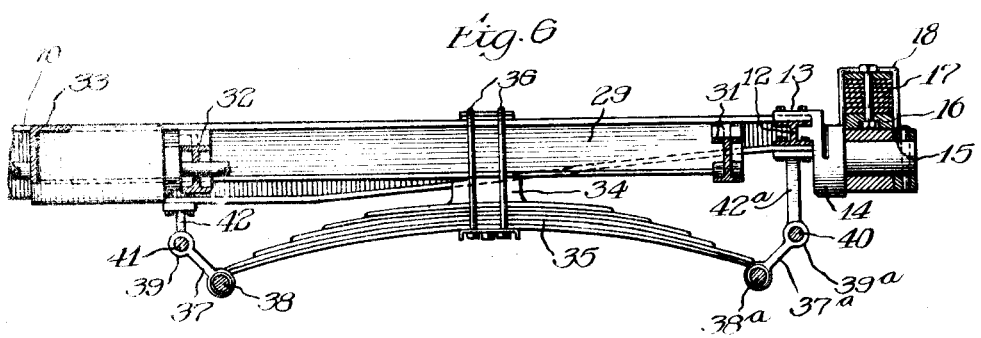
Inventor:
John H. Auf der Haar
by Michael & Stanton
Attys.

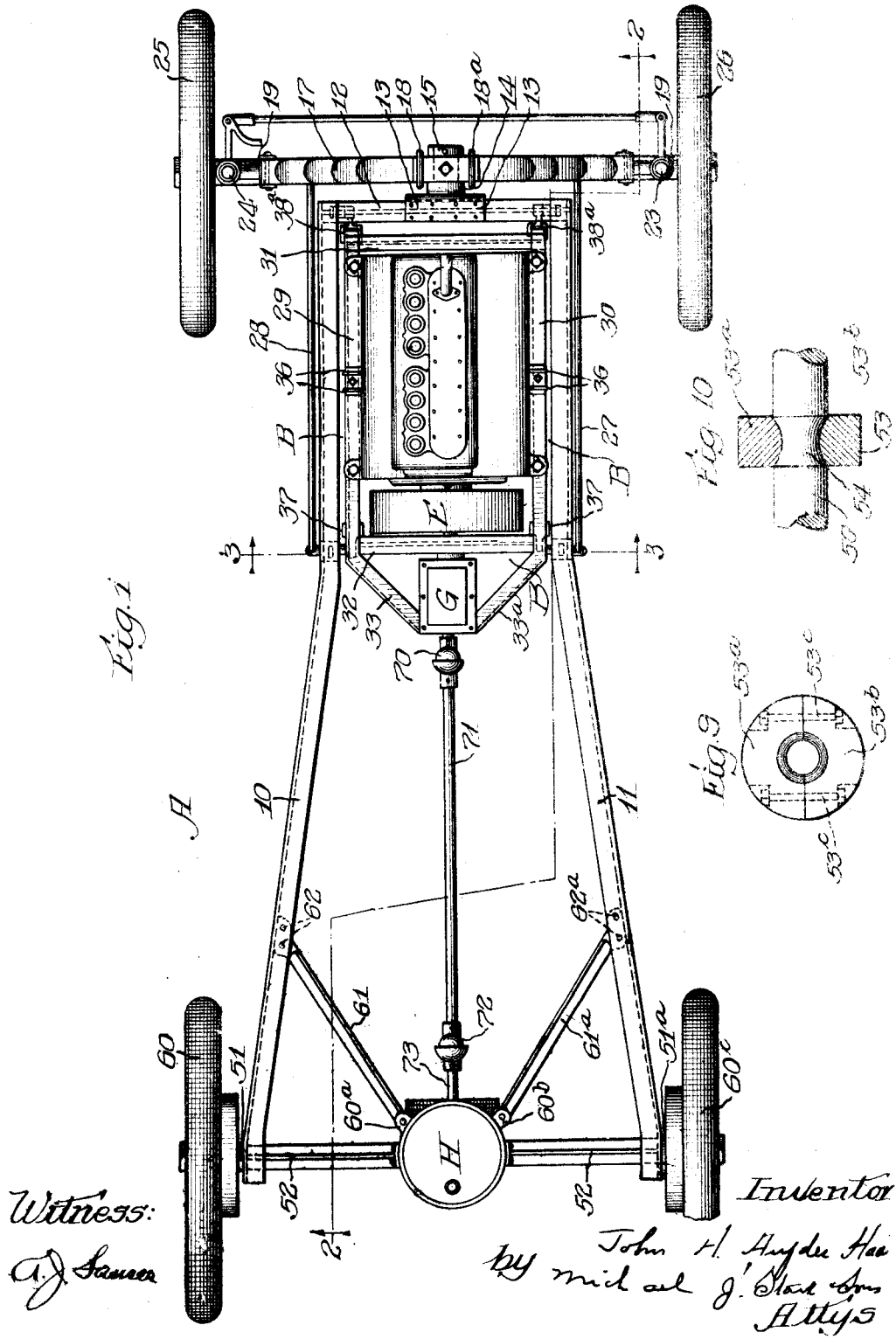

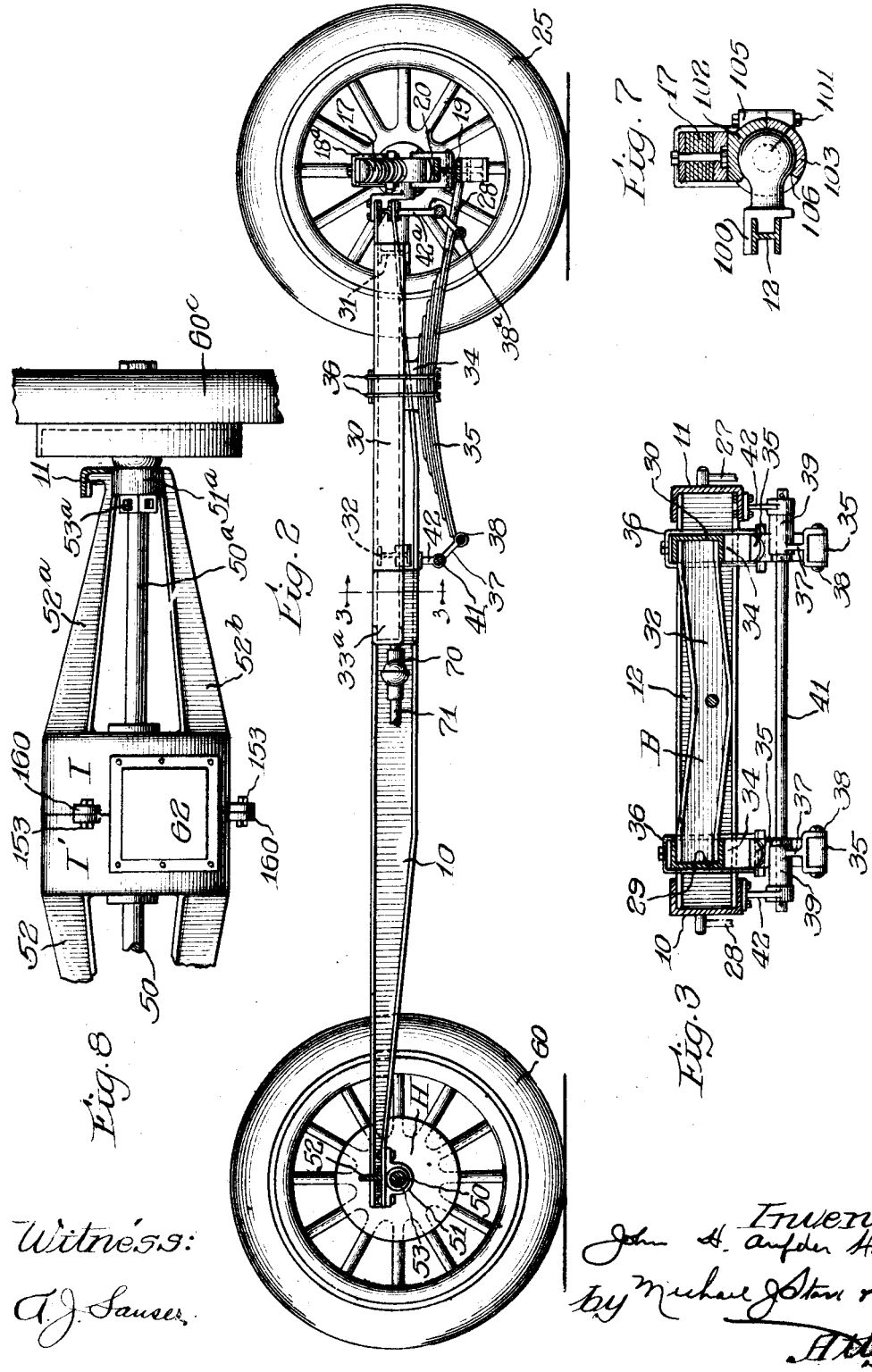

UNITED STATES PATENT OFFICE.

JOHN H. AUFDER HAAR, OF CHICAGO, ILLINOIS.

AUTOTRUCK.

1,171,043.  Specification of Letters Patent.  Patented Feb. 8, 1916.

Application filed April 29, 1915. Serial No. 24,770.

*To all whom it may concern:*

Be it known that I, JOHN H. AUFDER HAAR, a citizen of the United States, and a resident of the city of Chicago, in the county of Cook and State of Illinois, have invented a certain new and useful Improvement in Autotrucks; and I do hereby declare that the following description of my said invention, taken in connection with the accompanying sheets of drawings, forms a full, clear, and exact specification, which will enable others skilled in the art to which it appertains to make and use the same.

My invention relates generally to improvements in auto trucks and it consists, essentially, in the novel and peculiar combination of parts and details of construction, as hereinafter first fully set forth and described and then pointed out in the claims.

In the drawings already referred to, which describe my invention more fully, Figure 1 is a plan of my newly invented auto truck. Fig. 2 is a vertical, longitudinal section thereof, in line 2—2 of Fig. 1. Fig. 3 is a transverse, vertical section in line 3—3 of Fig. 2. Fig. 4 is a front elevation of my device. Fig. 5 is a rear elevation thereof. Fig. 6 is a vertical, longitudinal section of the engine supporting mechanism, and Fig. 7 is a section of a modified form of support for the front axle. Fig. 8 is a rear elevation of a modified type of construction of the rear axle, differential box, and brackets therefor. Fig. 9 is a plan of the set collar employed in connection with said rear axle, and Fig. 10 is a vertical section thereof as employed in the said axle, the latter being in fragmentary form.

Like parts are indicated by corresponding characters or symbols of reference in all the figures of the drawings.

In the construction of my truck, I employ a plurality of new and novel features, producing new and useful results which tend to increase the life and efficiency of such mentioned vehicles. In the first place, the chassis of my truck is rigidly mounted to the rear axle bearings and they in turn, are positively fixed to both the chassis and to the differential gearing, whereby the rear end of the vehicle, is practically a rigid structure, and not liable to vibrations connected with the automobile of the present day. The front end of the chassis, is supported centrally of its width, by means of an oscillatable blade spring of elliptical type, fastened to the axle, parallel to the front end of said chassis so that should either of the front wheels drop into a rut, or any depression of the road, the forward end of the chassis will still remain in a horizontal plane, by reason of the fact that the front axle and wheels may oscillate upon a central support.

Another important feature of my device is that the engine is suspended independently and yieldingly from the chassis itself, so, that no matter what vibration may exist in the chassis, either vertically, transversely, or longitudinally, the engine itself will not be subjected to any strains other than that of the propulsive power.

On motor trucks in general, as is well known, the chassis is spring mounted at four points, and the chassis itself vibrates upwardly and downwardly, laterally and longitudinally, during its course of progress; in a like manner the engine vibrates, and as the frame at times is distorted, an enormous amount of friction is created in the engine. It is this unnecessary yielding vibration of the chassis, that I wish to overcome, and at the same time I wish to so devise my suspension frame for the engine that the motor is enabled to direct its full power thereof, to the transmission of the vehicle.

To better understand my invention, I will now refer to the drawings, in which A, Fig. 1, is the auto truck as a whole, and 10 and 11 are the side frames of the chassis. It will be noted that the forward part of the auto truck, the chassis frames are parallel, but at the end of the engine supporting frame, now designated B, the side frames begin to diverge until they acquire the proper separation at the rear axle thereof. The front end of the chassis frame is connected together by a structural bar 12, and, medially of the length of this bar 12 there is located a base 13, having a depending projection 14, terminating in a cylindrical member 15, the purpose of which will now be described.

Supporting and embracing member 15, is a bracket 16, which has side wings 16ª and 16ᵇ, upon which a heavy leaf spring 17 is supported and maintained by U-straps 18 and 18ª. This spring is parallel to the front of the chassis and is of a length considerably in excess of the width of the said chassis, and is supported by the eyes, at either end thereof, to a front axle 19, by means of links 20.

The front axle 19 of any typical construction, as are steering knuckles 21 and 22 at either end thereof, whereon are the steering ends 23 and 24, carrying the front wheels 25 and 26. It will now be observed that were the truck in forward motion, there would be a backward force with respect to axle 19, spring 17 and the wheels. In order to prevent the backward force, as it were, I provide two side rods 27 and 28 fastened at one end to either side of the chassis, a sufficient distance back from the end thereof, and fastened with their other end to the axle 19, as clearly seen in Fig. 4, these rods 27 and 28 are fixed to the sides of the chassis quite a distance from the front thereof, and are rather a loose fit at the chassis and axle as well, so that as the axle vibrates laterally, the elongation or shortening of the rod will have no effect upon the operation of the mechanism described.

It will now be observed that the chassis is suspended, rather spring suspended, centrally of its width at the forward end and it should be further observed that as one of the wheels enters a depression or as the other wheel overcomes an obstruction on the road, the plane of the front end of the chassis will remain horizontal. The steering mechanism actuating the front wheels for purposes of steering, is of the usual class, and need not be further described in this specification.

Located between the parallel portions of the side members 10 and 11 of the chassis and of a width considerably less than the distance between said side members, is located the engine frame B. This engine frame consists of two parallel structural members 29 and 30 spaced a proper distance apart and connected by cross structural members 31 and 32. At the rear end of this engine frame are arranged converging structural members 33 and 33ª, joined together medially of the width of the frame, and the purpose of which is to form a support for the transmission, or typical type of gear box G.

Located under the side frames 29 and 30 of the engine frame, are blocks 34, under which there are located leaf springs, preferably of the semi-elliptical type, 35, which springs are fixed to the side frames by U-shaped heavy clips 36. The opposite ends, or the eyes of these springs are fastened to forked arms 37 and 37ª by pins 38 and 38ª. The upper end of the forked arms 37 and 37ª are engaged by rods 40 and 41, which rods extend the full width of the chassis frame, and are supported thereunder by brackets 42 and 42ª. Referring now to Fig. 5 which indicates the usual type of differential case, from which emanate in oppositely extending directions, the main driving shafts 50 and 50ª, which shafts are journaled in journal boxes 51 and 51ª, which in turn are riveted or electrically welded to the bottom face of the side frames 10 and 11. It is noticed that welded to the end of frame members 10 and 11, are brackets 52, the farther ends of which are fixedly attached to the gear differential box H before mentioned. It will therefore be seen that the entire rear end of the truck is rigidly or unyieldingly mounted upon the wheels 60 and 60ª, the collars 53 and 53ª are fixed to the shafts 50 and 50ª adjacent the boxes 51 and 51ª to prevent outward movement of the shafts 50 and 50ª in a manner readily comprehended.

Provided at the forward corners of the differential box H at the shaft level thereof, are oppositely located lugs or projections 60ᵇ and 60ª, to which are fastened diagonal rods or bars 61 and 61ª, the opposite ends of which are fastened to the frames 10 and 11 by rivets or other means 62 and 62ª, whereby a rigid construction either in tension or compression is arranged.

The engine E is located upon the engine base B in the usual manner and its shaft therefrom is passed through the gear box G. At the rear of the gear box G there is located a universal coupling 70, connected to the drive shaft 71; at the rear end of which is another universal coupling 72, which coupling connects with the shaft 73, entering the differential box H, the details of construction within which may be of the usual type, and has no part in my invention.

The extreme rigidity of the rear end of the chassis is now referred to, and it will be noted that the load on the chassis will not have the tendency to create a universal vibration thereof. Furthermore there will be no tendency to the widening apart of the chassis at the rear end thereof. If one or the other of the rear wheels 60 or 60ª have been depressed, due to a sunken spot on the road, the stiffness of construction of the chassis will assist wonderfully in enabling the motor to pull the vehicle back on solid ground owing to the fact that the full energy of the motor is being usefully expended, this feature is an extremely important one.

Attention is now called to the operation of my vehicle, assuming it to be traveling along a road when at once the forward wheel 25 drops into a rut or depression. In as much as the wheel and its supporting mechanism is centrally and oscillatably mounted on the bracket 15, it will be seen that the front of the chassis frame will remain in a horizontal position, as will the engine frame B. The engine frame remaining horizontal and adjusting itself to the peculiar conditions, the engine will be operating normally and developing its entire energy toward the forward movement of the vehicle through the shaft 70 in an evident manner. It will be observed that no matter what the conditions may be, whether the front wheels are depressed or raised, or the rear wheels depressed or raised, the engine is always in normal position, and is therefore able to exert its entire force of energy in a proper manner, because of being free from any stresses or strains which would reduce its effective energy.

In Fig. 8 I disclose a new form of differential box and chassis connections, which will become the preferred form of construction employed in very heavy trucks. In this construction, the differential box is formed of two like halves I and I', held together by lugs 160 and bolts 153 passing therethrough.

Projecting outwardly from the sides of each of the halves I and I' of the differential box on opposite sides of the shaft 50 or 50ᵃ and cast integrally with their respective halves, are outwardly extending arms 52ᵇ and 52ᵃ which terminate at their ends in the journal box 51ᵃ, for the shaft 50ᵃ, the arm 52ᵃ is cast with an upward projecting flange which is welded, or electrically welded, or reinforced by rivets, to the frame 11 so as to secure an absolutely firm joint therewith. In the differential box, I and I' is formed an opening which is closed by a cover 62, which opening is large enough to remove from the interior of the box any of the gears it is desired to take out at any time.

In Figs. 9 and 10 are disclosed the collars employed adjacent the inner face of the journal box 51ᵃ; this collar is made in two halves 53ᵇ and 53ᵃ and is bolted together by bolts 53ᶜ. The interior of this collar is convexed in the same manner as the shaft 50 is concaved at that point, so that said collars are immovable so long as the bolts 53ᶜ are kept tight.

In Fig. 7 I indicate a universal joint support for the spring 17 at the front end of the chassis. Upon the forward cross member 12 of the chassis, and centrally of the width of the chassis, is maintained a base 100, terminating in an outwardly or forwardly extending spherical member 101. Resting upon the upper portion of this member is a bracket 102, and embracing the lower part of the spherical member 101 is a cap 103, which is fastened to the member 102 by bolts 105, passing therethrough. It is now pointed out that there are left openings at the rear end as 106 and at the sides as well so as to permit of the lateral as well as longitudinal oscillation of the springs 17.

I now call attention to the fact that I will in heavy trucks extend the chassis frame bars 10 and 11 a matter of a few feet beyond the present location, leaving the transmission shafts and appurtenances in their present position, and fix sprocket wheels to the outer ends of the shafts 50 and 50ᵃ. Then under the rear ends of the chassis frames 10 and 11 I will fasten what is technically known as a dead axle, having its outer ends adapted for free rotation thereon of the wheels 60 and 60ᵃ. Each of these wheels will have sprocket wheels over which and the shafts 50 and 50ᵃ will be trained sprocket chains. This structure is well within the spirit of my invention, and I claim it as such.

I have hereinbefore disclosed the preferred mode of practising my invention, but I reserve the right to make such and any changes as might occur to one skilled in the art to which this invention appertains, or to make any and all such alterations as may be permitted under the doctrine of equivalents.

Having thus fully described my invention I claim as new, and desire to secure to myself by Letters Patent of the United States:—

1. A truck frame including longitudinal side members, transverse members connecting the rear end of said side members, there being interposed between said transverse members a differential gear box, wholly supported by said transverse members, diagonal braces connecting said gear box and side members, and rear drive shafts located below said transverse members, journaled under said side members, and within said gear box, said drive shafts having rear drive wheels at the free ends thereof.

2. In a truck, a frame including longitudinal side members, a transverse rear member connecting the rear ends of the side members and also forming the rear axle, and a differential gear box arranged at the center of the transverse member, and diagonally extending brace bars connected at their rear extremities to the gear box and at their front ends to the side members.

3. An auto truck comprising a main frame having longitudinal side members, a transverse front member connecting said side members at the front end thereof, transverse members rigidly connecting the rear ends of said side members, there being interposed between said transverse members a differential gear box, wholly supported by said transverse members, drive shafts located below said transverse members, journalled under said side members, and within said gear box, and driving wheels at the free ends of said shafts; a motor sub-frame located between said side members, near the front ends thereof, and, yieldingly supported from beneath said side members, a motor on said sub-frame, power transmission means connecting said motor and said differential gear box, and a front axle and wheels in connection with said transverse front member.

4. An auto-truck comprising a main frame having longitudinal side members, a transverse front member connecting said side members at the front end thereof, transverse members rigidly connecting the rear ends of said side members, there being interposed between said transverse members a differential gear box, wholly supported by said transverse members, drive shafts located below said transverse members, journaled under said side members, and within said gear box, and driving wheels at the free ends of said shafts; a motor sub-frame located between said side members, near the front ends thereof, and, free for universal vibration between said side members, and yieldingly supported from beneath said side members, a motor on said sub-frame, power transmission means connecting said motor and said differential gear box, and a front axle and wheels in connection with said transverse front member.

In testimony that I claim the foregoing as my invention, I have hereunto set my hand.

JOHN H. AUFDER HAAR.